United States Patent
Ooyama et al.

(10) Patent No.: US 6,785,441 B2
(45) Date of Patent: Aug. 31, 2004

(54) OPTICAL FIBER COLLIMATOR

(75) Inventors: Ikuto Ooyama, Osaka (JP); Takashi Fukuzawa, Osaka (JP); Seiji Kai, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/025,986

(22) Filed: Dec. 26, 2001

(65) Prior Publication Data

US 2002/0094163 A1 Jul. 18, 2002

(30) Foreign Application Priority Data

Dec. 26, 2000 (JP) ........................................ 2000-395902

(51) Int. Cl.[7] ............................................... G02B 6/32
(52) U.S. Cl. ............................................. 385/34; 385/33
(58) Field of Search ............................. 385/31, 33, 34

(56) References Cited

U.S. PATENT DOCUMENTS

| | | | | |
|---|---|---|---|---|
| 4,636,030 A | * | 1/1987 | Carter et al. | 385/25 |
| 5,588,081 A | * | 12/1996 | Takahashi | 385/93 |
| 5,682,452 A | * | 10/1997 | Takahashi | 385/85 |
| 5,734,762 A | | 3/1998 | Ho et al. | |
| 5,841,923 A | * | 11/1998 | Kyoya | 385/93 |
| 6,142,678 A | * | 11/2000 | Cheng | 385/79 |
| 6,409,398 B2 | * | 6/2002 | Nakaya et al. | 385/93 |

FOREIGN PATENT DOCUMENTS

| | | | | |
|---|---|---|---|---|
| DE | 3910166 A1 | * 10/1990 | | G02B/6/32 |
| DE | 39 10 166 | 11/1990 | | |
| JP | 62235909 A | * 10/1987 | | G02B/6/32 |
| TW | 336285 | 7/1998 | | |

OTHER PUBLICATIONS

SELFOC Product Guide Sep. 1993.
European Search Report for European Application corresponding to above–identified application (Apr. 2002).

* cited by examiner

Primary Examiner—John D. Lee
(74) Attorney, Agent, or Firm—Whitham, Curtis & Christofferson, P.C.

(57) ABSTRACT

An optical fiber collimator having a lens (10), and an optical fiber chip (14) disposed at a distance from the lens, the optical fiber chip holding an end portion of an optical fiber (12) and having an end surface treated to be inclined. The optical axis of the optical fiber is made eccentric with respect to the center of the lens to set the eccentric quantity of the optical fiber so that the center of the lens substantially coincides with the center of a light beam incident on the lens. The kind of the lens is optional. The lens may be an inexpensive spherical lens or may be a gradient index rod lens. When a gradient index rod lens is used, a lens in which a surface facing to the optical fiber chip is treated to be inclined is used as the gradient index rod lens.

18 Claims, 3 Drawing Sheets

OPTICAL FIBER COLLIMATOR

BACKGROUND OF THE INVENTION

The present invention relates to an optical fiber collimator in which a lens and an optical fiber are combined in order to collimate light emitted from an optical fiber into parallel light rays or to converge the parallel light rays into the optical fiber. The optical fiber collimator is useful in the case where light rays need to be kept parallel particularly in a long distance, for example, in an optical device having a structure in which parallel light rays pass through any kind of optical function device.

In the optical communication field, there is used an optical device in which two optical fiber collimators are disposed at a distance from each other and opposite to each other and an optical function device is disposed between the two optical fiber collimators so that parallel light rays pass through the optical function device. When light rays need to be kept parallel over a long distance, the beam diameter needs to be made large in accordance with the structure of the optical function device. Therefore, a long focal length lens is generally used in each of the optical fiber collimators.

On the other hand, in an optical device using propagation of light through space as described above, it is regarded as a matter of common knowledge that an end surface of an optical fiber is formed as an inclined surface in order to suppress feedback return light. In most cases, an obliquely polishing treatment is made.

The kind of the lens used in such an optical fiber collimator is not particularly limited but a gradient index rod lens which is columnar can be easily combined with an optical fiber chip holding an optical fiber. This is because it is easy to make an arrangement for making the center axis of the rod lens coincident with the optical axis of the optical fiber.

Light emitted from an optical fiber having an end surface treated to be inclined has an angle with respect to the optical axis because of the refractive index difference between the optical fiber and space. Hence, the center of a light beam incident on the lens slips out of the center of the lens. It is therefore necessary to use a lens having a large effective diameter. Hence, there is a disadvantage in that the outer diameter of the optical fiber collimator must be large. This is because insertion loss increases in a small-diameter lens owing to light beam shading and aberration loss generated.

SUMMARY OF THE INVENTION

An object of the invention is to provide an optical fiber collimator in which light rays can be kept parallel over a long distance and which can be reduced in diameter in spite of low insertion loss so that the effective diameter of a lens can be used efficiently.

According to the invention, there is provided, for example, an optical fiber collimator having a lens; and an optical fiber chip arranged at a distance from the lens, the optical fiber chip holding an end portion of an optical fiber and having an end surface treated to be inclined. Here, according to the invention, an optical axis of the optical fiber is configured to be made eccentric with respect to a center of the lens to thereby set a quantity of eccentricity of the optical fiber so that the center of the lens substantially coincides with a center of a light beam incident on the lens.

The kind of the lens is optional. The lens may be an inexpensive spherical lens or may be a gradient index rod lens. When a gradient index rod lens is used, a lens in which a surface facing the optical fiber chip is treated to be inclined may be preferably used as the gradient index rod lens so that the inclined surface of the lens is set to be substantially parallel (but not necessarily completely parallel) with the inclined end surface of the optical fiber chip. Further, the optical axis of the optical fiber is made eccentric with respect to the center of the rod lens so that the eccentric quantity of the optical fiber is set so that the center of the rod lens substantially coincides with the center of a light beam incident on the rod lens from the optical fiber.

As a typical example of the invention, there is a cylindrical member in which the lens and the optical fiber chip are incorporated in the cylindrical member so that the center of the lens coincides with the center of the optical fiber chip in a condition that the optical fiber is inserted and held in an optical fiber insertion hole formed in an eccentric position of the optical fiber chip. Alternatively, there is provided another cylindrical member which has a lens holding hole and an optical fiber chip holding hole formed so that the axes of the holding holes are shifted from each other, the lens and the optical fiber chip being inserted and fixed in the holding holes respectively to thereby be incorporated in a cylindrical member so that the optical fiber chip is made eccentric with respect to the center of the lens in a condition that the optical fiber is inserted and held in an optical fiber insertion hole formed in a center of the optical fiber chip.

The present disclosure relates to the subject matter contained in Japanese patent application No. 2000-395902 (filed on Dec. 26, 2000), which is expressly incorporated herein by reference in its entirety.

DESCRIPTION OF THE PREFERRED EMBODIMENT

Figure 1:
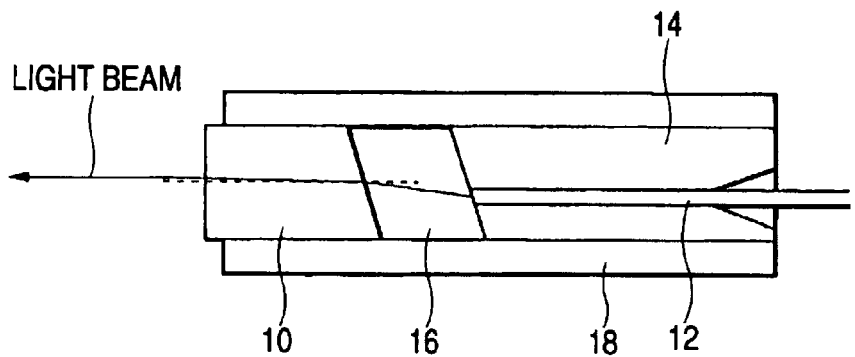
FIG. 1 is a sectional view showing an embodiment of an optical fiber collimator according to the invention.
Figure 2:
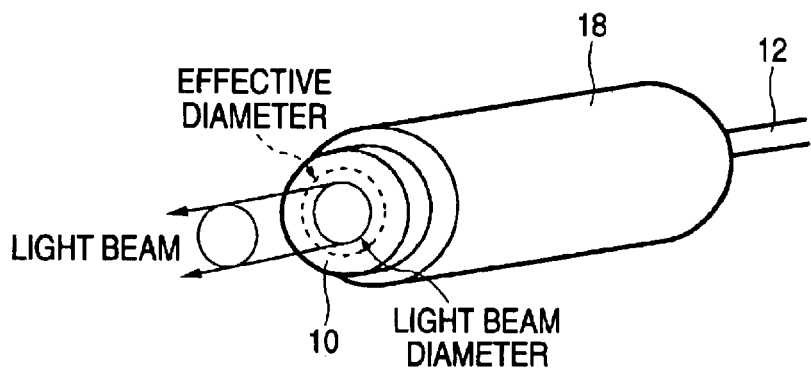
FIG. 2 is a perspective view showing an external appearance of the optical fiber collimator.

FIG. 1 is a sectional view showing an embodiment of an optical fiber collimator according to the invention. FIG. 2 is a perspective view of the external appearance thereof. The optical fiber collimator includes a gradient index rod lens 10 with a long focal length, and an optical fiber chip 14 holding an end portion of an optical fiber 12 and arranged at a distance from the rod lens 10. In this embodiment, the rod lens 10 and the optical fiber chip 14 are shaped like columns equal in outer diameter to each other. Hence, there is provided a cylindrical member 18 having a cavity 16 which is shaped like a circle in section and straight from one end to the other end so that both the rod lens 10 and the optical fiber chip 14 can be inserted in the cavity 16. That is, the optical fiber collimator has a structure in which the rod lens 10 and the optical fiber chip 14 are inserted in the inside of the cylindrical member 18 and bonded/fixed thereinto. On the other hand, when the outer diameter of the rod lens is different from that of the optical fiber chip, there may be used a cylindrical member having cavities formed coaxially from its opposite ends so that both the rod lens and the optical fiber chip can be inserted in the cavities respectively.

An end surface of the optical fiber 12 is formed as an inclined surface to suppress a reflected feedback beam. In this embodiment, an end surface of the optical fiber chip 14 holding the optical fiber 12 is polished to be inclined and, at the same time, the optical fiber 12 is polished to be inclined (the angle of inclination being generally set to about 8 degrees). On the other hand, a surface of the rod lens 10 facing the optical fiber chip 14 is polished to be inclined. In this embodiment, the inclined surface of the rod lens 10 is set to have an angle (for example, of about 6 degrees) slightly different from that of the inclined surface of the optical fiber chip 14.

In this embodiment, the optical fiber chip 14 is used so that the optical fiber 12 is held in a position eccentric relative to the center axis of the optical fiber chip 14. A through-hole is formed in a position which is eccentric with respect to the center axis of the optical fiber chip 14 by a predetermined distance in a predetermined direction. The optical fiber 12 is inserted in the optical fiber chip 14 through a spread-open portion of a rear end surface of the through-hole and fixed by an adhesive agent. Then, the front end surface of the optical fiber chip 14 is polished to be inclined as described above. The optical fiber chip 14 produced thus is inserted in the cylindrical member 18 to thereby make the optical axis of the optical fiber 12 eccentric relative to the center of the rod lens 10. The eccentric quantity thereof is set so that the center of the rod lens 10 substantially coincides with the center of a light beam incident on the rod lens 10 from the optical fiber 12.

Incidentally, the opposite end surface of the rod lens 10 and the end surface of the optical fiber chip 14 (inclusive of the optical fiber 12) are subjected to anti-reflection coating (AR coating) in the same manner as in the related art.

Because the end surface of the optical fiber chip 14 is treated to be inclined as described above and space and glass are different in refractive index from each other, a light beam emitted from the end surface of the optical fiber has a predetermined angle with respect to the center axis of the rod lens 10 (or the optical axis of the optical fiber 12). Further, when a long focal length lens is used as the rod lens 10, the distance between the end surface of the optical fiber and the end surface of the rod lens becomes long. If the rod lens 10 and the optical fiber 12 are arranged so that the center axis of the rod lens 10 coincides with the optical axis of the optical fiber 12, the center of a light beam emitted from the optical fiber 12 slips largely out of the center of the rod lens 10. In the invention, therefore, the optical fiber chip 14 in which the position of the optical path of the optical fiber 12 is made eccentric relative to the center axis of the optical fiber chip 14 is used to make a design as follows. That is, the axis of the optical fiber chip 14 is shifted on the basis of calculation of the eccentric quantity of the optical axis of the optical fiber in advance so that a light beam refracted by the end surface of the optical fiber can be made just incident on the center of the end surface of the rod lens.

The inclination angle of the end surface of the rod lens 10 is determined so that a light beam transmitted in the rod lens is regarded as substantially straightly travelling and so that a light beam exiting from the rod lens has a slight angle with respect to the center axis in consideration of a reflected feedback light beam. Accordingly, a light beam can be transmitted in the effective diameter of the rod lens, so light beam shading and aberration loss can be suppressed. Hence, low insertion loss can be achieved.

Figure 3:
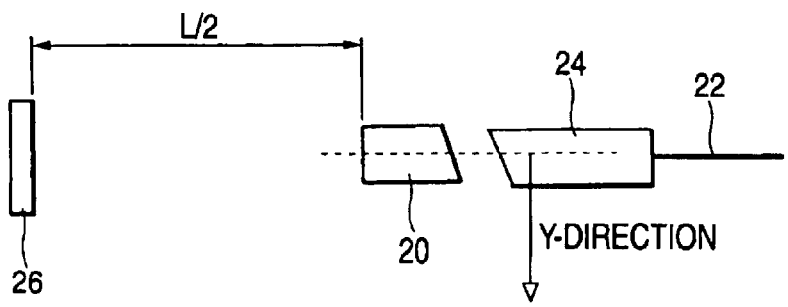
FIG. 3 is a view for explaining a measuring system.

A measured result of the influence of the eccentric quantity on insertion loss will be described below. FIG. 3 shows a system for measuring the influence. A single mode optical fiber 22 was inserted and fixed in an optical fiber chip 24. Then, the optical fiber chip 24 was treated so that the inclination angle of an end surface of the optical fiber chip 24 was set to 8 degrees. As a gradient index rod lens 20, there was used a lens having an angular aperture of 18 degrees and a lens length of 0.1 pitches and having an incidence end surface (a surface facing the optical fiber chip) with an inclination angle of 6 degrees. A collimated light beam was reflected by a mirror 26, so that loss against incident light was obtained. Incidentally, the distance between the rod lens and the optical fiber was set to 2.65 mm (constant)

Figure 4:
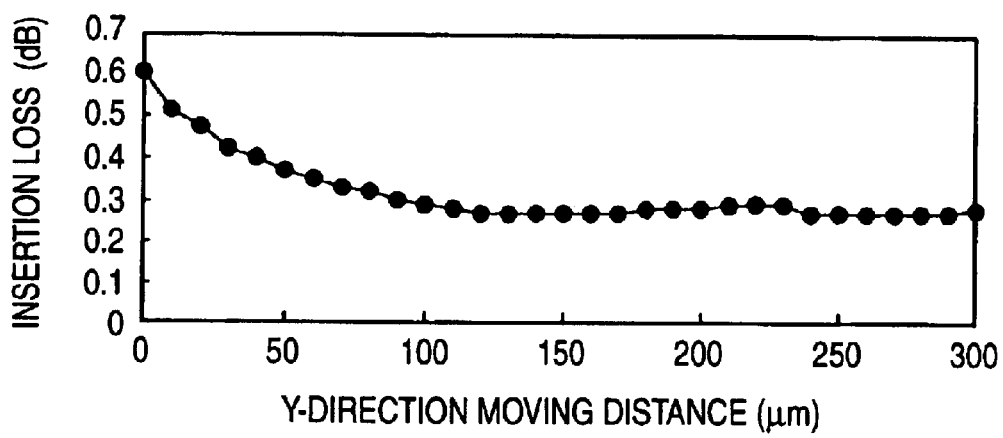
FIG. 4 is a graph showing results of measurement of insertion loss versus Y-direction moving distance.

FIG. 4 shows the relation between the moving distance of the optical fiber chip 24 and insertion loss when the optical fiber chip 24 is moved in an Y-direction in the condition that the working distance (lens distance) L is 150 mm. When the Y-direction moving distance is zero (that is, when the center axis of the rod lens coincides with the optical axis of the optical fiber), insertion loss is about 0.6 dB. It is found that the insertion loss is reduced as the optical fiber chip is moved in the Y-direction and that the insertion loss becomes not larger than 0.3 dB when the Y-direction moving distance becomes not smaller than 100 $\mu$m.

Figure 5:
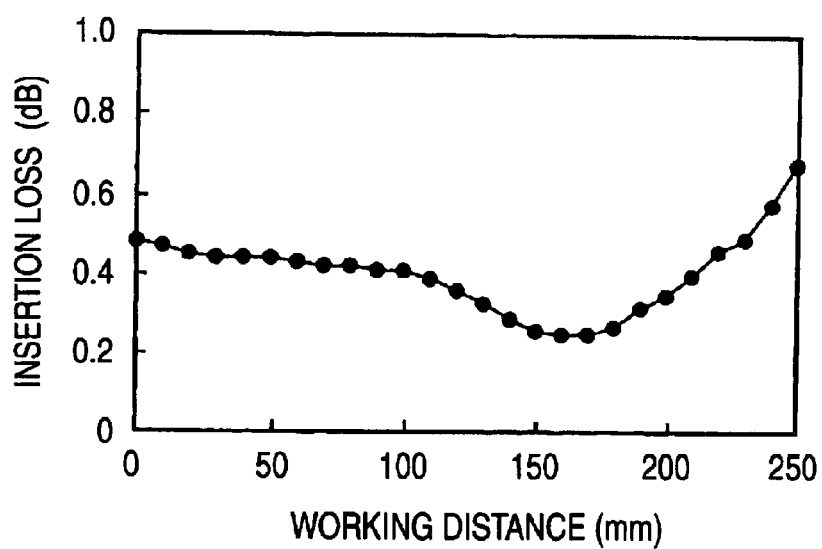
FIG. 5 is a graph showing results of measurement of insertion loss versus working distance (lens distance).

Further, the insertion loss was measured while the working distance L was changed in the condition that the Y-direction moving distance was fixed to 133 $\mu$m. As shown in FIG. 5, it is found that the insertion loss is minimized when the working distance L is about 170 mm. The working distance L to minimize the insertion loss can be set to a desired value by changing the pitch of the rod lens.

The aforementioned result was backed up with simulation. It is now assumed that the refractive-index distribution of the rod lens is most simplified as given by the following expression:

$$n(r)^2 = n_0^2\{1-(g \cdot r)^2\}$$

in which n(r) is a refractive index in a position at a distance $r$ from the center axis, $n_0$ is a refractive index on the center axis, and $g$ is a quadratic refractive-index distribution coefficient.

Figure 6:
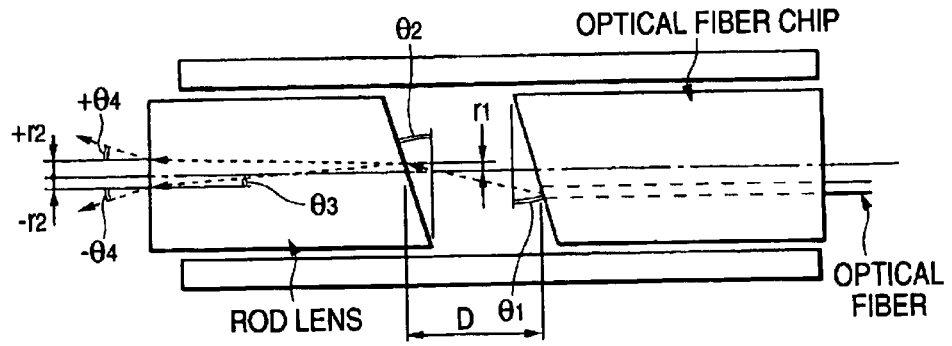
FIG. 6 is an explanatory view showing the way of defining angles and positions of respective members and light rays.

The eccentric quantity (the Y-direction moving distance) of the optical fiber with respect to the center axis of the rod lens, the center position (the quantity of displacement from the center axis of the rod lens) $r_2$ of a light beam on the exit end surface of the rod lens and the angle $\theta_4$ of the beam on the exit end surface of the rod lens were calculated by using this expression. FIG. 6 shows the way of defining the angles and positions of respective members and light rays. Optical parameters used in this simulation were as follows.

Figure 7:
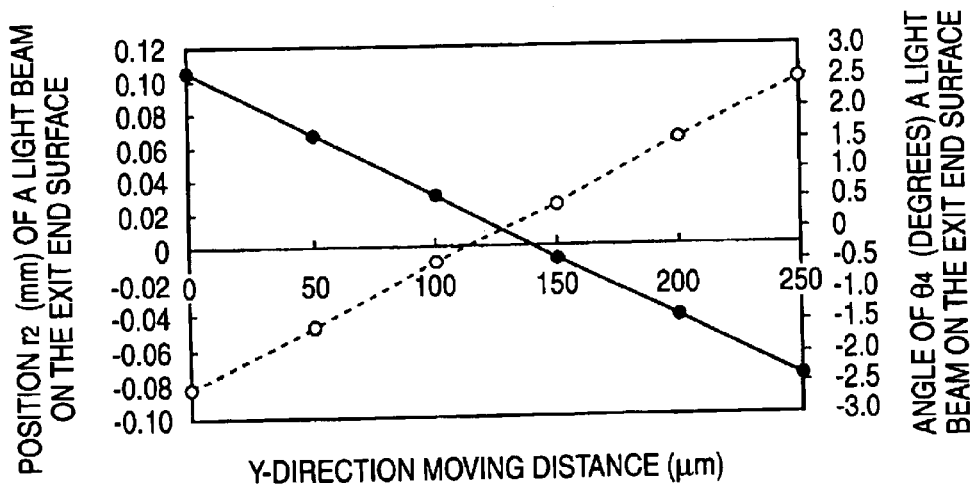
FIG. 7 is a graph showing results of simulation.

Effective radius $r_0$ of the rod lens: 360 $\mu$m
Mean refractive index $n_0$ of the rod lens: 1.5902
Quadratic refractive-index distribution coefficient g: 0.322 $mm^{-1}$
Length Z of the rod lens: 0.12P=2.324 mm (in which P (=2Π/g) is the pitch (periodic length) of the rod lens)
Angular aperture of the rod lens: 12 degrees
Inclination angle $\theta_2$ of the end surface of the rod lens: 6 degrees Refractive index of the optical fiber: 1.46
Inclination angle $\theta_1$ of the optical fiber: 8 degrees
Rod lens-optical fiber distance D: 2.079 mm FIG. 7 shows results of the calculation. It is obvious from FIG. 7 that the Y-direction moving distance is about 130 m when the center position (the quantity of eccentricity with respect to the center axis of the rod lens) $r_2$ of the light beam on the exit end surface of the rod lens is about zero and the angle $\theta_4$ of the light beam on the exit end surface of the rod lens is also small.

The method of determining the inclination angle of the end surface of the rod lens and the inclination angle of the end surface of the optical fiber will be described below more in detail. In the optical fiber collimator according to the invention, the following two kinds of reflected feedback rays should be considered. Firstly, there is the case where light emitted from the optical fiber is made to enter the optical fiber again by some reflection. In this case, light reflected by the opposite end surfaces of the rod lens and some reflection surface outside the optical fiber collimator becomes a subject of discussion. If the incidence end surface of the rod lens is formed as an inclined surface, feedback of the reflected light from the surface can be avoided. Further, if the rod lens is designed so that parallel light rays exiting from the rod lens are inclined to the center axis of the rod lens even slightly, feedback of reflected light from the exit end surface of the rod lens can be avoided. Although it may be considered that reflected light from the outside feeds back along the same path, such a case is very rare. Secondly, there is the case where light emitted from an external optical device is reflected by the optical fiber collimator and fed back to the external optical device. Because light entering from the outside and coupled with the optical fiber enters the end surface of the rod lens slightly obliquely, feedback of light reflected on the outer surface of the rod lens can be avoided. Further, when the end surface of the optical fiber is formed as a surface inclined (for example, at 8 degrees), feedback of light reflected on this surface can be also avoided.

For the aforementioned reason, the inclination angle $\theta_1$ of the end surface of the optical fiber and the inclination angle $\theta_2$ of the end surface of the rod lens as shown in FIG. 6 have no particular relation with each other. The two angles may be equal to each other or may be different from each other. Further, the absolute values of the two angles are not particularly limited. It is a matter of course that it is difficult in terms of treatment to form an excessively large angle. Hence, each of the two angles is generally set to be in a range of from 4 to 8 degrees.

From the description, inclination angles $\theta_1$ and $\theta_2$ and lens parameters (light beam matrix) are given in a design to determine the position of the optical axis of the optical fiber so that the angle (light beam inclination angle) $\theta_4$ of light rays on the exit end surface of the rod lens is set to be in a range of ±0.5 degrees and that the center position (the quantity of eccentricity with respect to the center axis of the rod lens) $r_2$ of light rays on the exit end surface of the rod lens is minimized. Although the distance D between the end surface of the rod lens and the end surface of the optical fiber is one of the parameters, the distance is adjusted in practical assembling.

Figure 8:
FIG. 8 is a sectional view showing another embodiment of the optical fiber collimator according to the invention.

FIG. 8 is a sectional view showing another embodiment of the optical fiber collimator according to the invention. Similarly to the previous embodiment, the optical fiber collimator has a gradient index rod lens 30 with a long focal length, and an optical fiber chip 34 holding an end portion of an optical fiber 32 and disposed at a distance from the rod lens 30. The rod lens 30 and the optical fiber chip 34 may be shaped like columns having outer diameters equal to each other or may have outer diameters different from each other.

An end surface of the optical fiber chip 34 together with the optical fiber 32 are polished to be inclined (at an angle of about 8 degrees). A surface of the rod lens 30 facing the optical fiber chip is also polished to be inclined (for example, at an inclination angle of about 6 degrees). The optical fiber chip 34 used in this embodiment is formed so that the optical fiber 32 is located on the center axis of the optical fiber chip 34 in the same manner as in the related art. A cylindrical member 38 is provided so that both the rod lens 30 and the optical fiber chip 34 are held therein. The cylindrical member 38 has a sectionally circular cavity which is formed from one end side so that the rod lens 30 can be inserted in the cavity, and a sectionally circular cavity which is formed from the other end side so that the optical fiber chip 34 can be inserted in the cavity. The cylindrical member 38 has a structure in which the two cavities communicate with each other in the condition that the center axis of one cavity shifts by a predetermined eccentric quantity from the center axis of the other cavity. The rod lens 30 and the optical fiber chip 34 are inserted in the cylindrical member 38 and bonded/fixed therein. Hence, the optical axis of the optical fiber is made eccentric with respect to the center of the rod lens 30 by a predetermined quantity so that the center of the rod lens 30 substantially coincides with the center of a light beam incident on the rod lens from the optical fiber 32.

Although the embodiments have shown the case where a gradient index rod lens is used as the lens, the invention may be applied also to a homogenous lens such as a spherical lens or a convex lens. This is because, even in the homogeneous lens, the peripheral portion is large in aberration and bad in characteristic. Incidentally, the gradient index rod lens has an advantage in that the diameter of the lens can be reduced so that the lens can be easily combined with the optical fiber.

As described above, in accordance with the invention, there is provided an optical fiber collimator in which the optical axis of an optical fiber is made eccentric with respect to the center of a lens so that the center of the lens substantially coincides with the center of a light beam incident on the lens from the optical fiber. Because light rays can be kept parallel over a long distance by the simple way of setting the eccentric quantity to an optimal value, the invention can be applied to all long focal length lenses. Moreover, light beam shading and aberration loss generated can be suppressed so that low insertion loss can be achieved. Hence, the effective diameter range of the lens can be used efficiently.

According to the invention, even a small-diameter gradient index rod lens with a small effective diameter can be used. Hence, the outer diameter of the optical fiber collimator can be reduced. Further, a light beam can be made to pass through the rod lens substantially along the center axis of the rod lens so that the position of the light beam on the exit surface of the lens is substantially located in the center of the lens and so that the angle of the light beam on the exit surface of the lens is set to about zero. Accordingly, when two optical fiber collimators are disposed opposite to each other, the positional displacement of the two optical fiber collimators from each other can be reduced. Hence, reduction in diameter or size of the optical device can be attained.

What is claimed is:

1. An optical fiber collimator comprising:
   a rod lens having an inclined surface and a center axis;
   an optical fiber; and
   an optical fiber chip arranged at a distance from said lens, said optical fiber chip holding an end portion of said optical fiber and having an end surface treated to be inclined, wherein an optical axis of said optical fiber is eccentric with respect to the center axis of said rod lens such that the center axis of said rod lens substantially coincides with a center of a light beam incident on said rod lens from said optical fiber, and wherein an optical path of the optical fiber is eccentric with respect to a center axis of the optical fiber chip.

2. An optical fiber collimator according to claim 1, wherein said rod lens is a gradient index rod lens.

3. An optical fiber collimator according to claim 1, further comprising a cylindrical member which has a lens holding hole and an optical fiber chip holding hole formed so that the axes of said holding holes are fixedly located and shifted from each other, said lens and said optical fiber chip being inserted and fixed in said holding holes respectively to thereby be incorporated in said cylindrical member so that said optical fiber chip is made eccentric with respect to the center axis of said lens in a condition that said optical fiber is inserted and held in an optical fiber insertion hole formed in a center of said optical fiber chip.

4. The optical fiber collimator of claim 1, wherein the optical fiber chip and the rod lens have equal outer diameters.

5. The optical fiber collimator of claim 1, wherein the optical fiber chip and the rod lens have different outer diameters.

6. The optical fiber collimator of claim 2, wherein said rod lens has a maximum outer diameter which is substantially equal to an outer diameter of the optical fiber chip, and wherein the rod lens and the optical fiber are secured to each other with a cylindrical member having a constant inner diameter.

7. The optical fiber collimator of claim 2, wherein a refractive-index distribution of the rod lens is given by:

$$n(r)^2 = n_0^2 \{1 - (g \cdot r)^2\},$$

where $n(r)$ is a refractive index in a position at a distance $r$ from a center axis of the rod lens, $n_0$ is a refractive index on the center axis, and $g$ is a quadratic refractive-index distribution coefficient.

8. The optical fiber collimator of claim 1, wherein the inclination angles of the surfaces of the rod lens and the optical fiber chip and optical fiber are in a range from 4 to 8 degrees.

9. The optical fiber collimator of claim 1, wherein a cylindrical member having a through cavity in which said rod lens and said optical fiber chip are inserted from opposite ends thereof so that the inclined surfaces of the rod lens and the optical fiber chip and optical fiber are confronting and spaced from one another a predetermined distance.

10. An optical fiber collimator comprising:

a rod lens having an optical axis and an inclined surface;

an optical fiber having an optical axis and an inclined end surface; and a holding member which holds the inclined surface of said rod lens and the inclined end surface of said optical fiber in confronting relation and spaced from one another a predetermined distance so that the optical axis of the optical fiber is located at an eccentric position with respect to the optical axis of the rod lens such that the optical axis of the rod lens coincides with a center of a light beam incident on said rod lens from said optical fiber.

11. An optical fiber collimator according to claim 10, wherein the holding member includes a cylindrical optical fiber chip having a center and holding the optical fiber so that the optical axis of the optical fiber is located at an eccentric position with respect to the center of the cylindrical optical fiber chip.

12. An optical fiber collimator according to claim 11, wherein the holding member further includes a cylindrical member holding the rod lens and the optical fiber chip so that the rod lens and the optical fiber chip are concentric with respect to each other.

13. An optical fiber collimator according to claim 12, wherein the rod lens is a gradient index rod lens.

14. An optical fiber collimator according to claim 10, wherein the holding member includes a cylindrical optical fiber chip having a center and holding the optical fiber on the center thereof, and a cylindrical member holding the lens and the optical fiber chip so that the optical axis of the lens is located at an eccentric position with respect to the center of the optical fiber chip.

15. An optical fiber collimator according to claim 14, wherein the rod lens is a gradient index rod lens.

16. The optical fiber collimator of claim 10, wherein a cylindrical member having a through cavity in which said rod lens and said optical fiber chip are inserted from opposite ends thereof so that the inclined surfaces of the rod lens and optical fiber are confronting and spaced from one another a predetermined distance.

17. The optical fiber collimator of claim 10, wherein an optical path of the optical fiber is eccentric with respect to a center axis of the holding member.

18. The optical fiber collimator of claim 12, wherein the optical fiber chip and the rod lens have equal outer diameters.

* * * * *